(12) United States Patent
Grieve et al.

(10) Patent No.: US 9,321,534 B2
(45) Date of Patent: Apr. 26, 2016

(54) LAVATORY WITH STOWAGE COMPARTMENT

(71) Applicant: B/E Aerospace, Inc., Wellington, FL (US)

(72) Inventors: James C. Grieve, Arlington, WA (US); William J. Banfield, Lake Stevens, WA (US); Frank E. Hashberger, Snohomish, WA (US)

(73) Assignee: B/E Aerospace, Inc., Wellington, FL (US)

( * ) Notice: Subject to any disclaimer, the term of this patent is extended or adjusted under 35 U.S.C. 154(b) by 280 days.

(21) Appl. No.: 14/036,273

(22) Filed: Sep. 25, 2013

(65) Prior Publication Data

US 2014/0091178 A1   Apr. 3, 2014

Related U.S. Application Data

(60) Provisional application No. 61/707,422, filed on Sep. 28, 2012.

(51) Int. Cl.
*B64D 11/02* (2006.01)

(52) U.S. Cl.
CPC ..................................... *B64D 11/02* (2013.01)

(58) Field of Classification Search
CPC .... B64D 11/02; B60R 15/04; E04B 1/34869; A47K 4/00
See application file for complete search history.

(56) References Cited

U.S. PATENT DOCUMENTS

| 4,884,767 | A  | * | 12/1989 | Shibata | B64D 11/02 |
|           |    |   |         |         | 105/315    |
| 7,284,287 | B2 |   | 10/2007 | Cooper  |            |
| 7,549,606 | B2 |   | 6/2009  | Quan    |            |
| 2004/0163170 | A1 | * | 8/2004 | Cooper | B64D 11/02 |
|           |    |   |         |         | 4/664      |
| 2011/0253835 | A1 |  | 10/2011 | Cook et al. |        |

FOREIGN PATENT DOCUMENTS

| EP | 1433700 A2 | 6/2004 |
| EP | 850833 A2  | 10/2005 |

OTHER PUBLICATIONS

Dictionary.com, definition of lavatory, printed Aug. 25, 2015.*
EPO, International Search Report and Written Opinion from International Patent Application No. PCT/US2013/061939 dated Dec. 20, 2013.

* cited by examiner

*Primary Examiner* — Nicholas McFall
(74) *Attorney, Agent, or Firm* — Fulwider Patton LLP

(57) ABSTRACT

An aircraft lavatory comprising an enclosure having a door, a first side wall, a rear wall, a ceiling, and a second side wall, wherein the second side wall includes a sink, the second side wall defining a plane and wherein the sink is inwardly disposed from said plane. To create space for a stowage compartment, an additional side wall parallel to, and adjacent to, said second side wall is formed. This space houses a stowage compartment accessible from outside said lavatory, the stowage compartment formed between said second side wall and said additional wall.

5 Claims, 2 Drawing Sheets

LAVATORY WITH STOWAGE COMPARTMENT

CROSS-REFERENCES TO RELATED APPLICATIONS

This application claims priority from U.S. Application No. 61/707,422, filed Sep. 28, 2012, the contents of which is fully incorporated by reference in its entirety.

BACKGROUND

The present invention relates generally to aircraft enclosures, and more particularly relates to an aircraft cabin lavatory and compartment formed in a wall therein.

Anyone who has used an aircraft lavatory can attest to the fact that there is a limited amount of space available for anything, much less stowage. Although the space inside the lavatory is minimal at best, in many aircraft fuselage arrangements the construction and position of the lavatory leaves certain unused space just outside the walls, space that end up serving no useful purpose. This is partly a result of the aircraft's need to allow passenger's seats to be reclined, or simply to accommodate the last row of seating adjacent the lavatory. Because utilization of available space is critical to the performance, comfort, and maintenance of an aircraft, the more unused space that can be converted to useful space like stowage compartments, the more efficient the aircraft will be. The inventors of the current invention have devised a novel way to increase the usable space on the aircraft without loss of useful space in a lavatory.

In a commercial aircraft, a lavatory has a minimal footprint that is typically the width of a door, plus the area taken up by the sink and commode. A sink takes up a large portion of the space in a lavatory, as is necessary to capture a flow of water when washing of hands, etc. Above the sink is either a wall or a mirror, and a small drawer or cabinet may be provided for minimal supplies, tissue, soap, paper towels, and the like. In many cases, the area below the sink of an aircraft lavatory serves as a storage compartment in the aircraft, which may store life vests, emergency supplies, or other aircraft items used by the flight attendants. However, the present invention takes advantage of the area behind the wall to create a new storage area accessible adjacent the door of the lavatory.

SUMMARY OF THE INVENTION

The present invention is a stowage compartment built into the lavatory and accessible from the main cabin. The stowage compartment is formed between a newly installed wall in the lavatory that extends generally the length of the lavatory and from the ceiling to a height just above a low profile sink. The newly created space can include a pull out drawer or a small door that provides access to the stowage compartment. The present invention increases the storage area in the aircraft without reducing the area for passenger legroom or the galley, depending upon the location of the lavatory with respect to the rest of the cabin.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
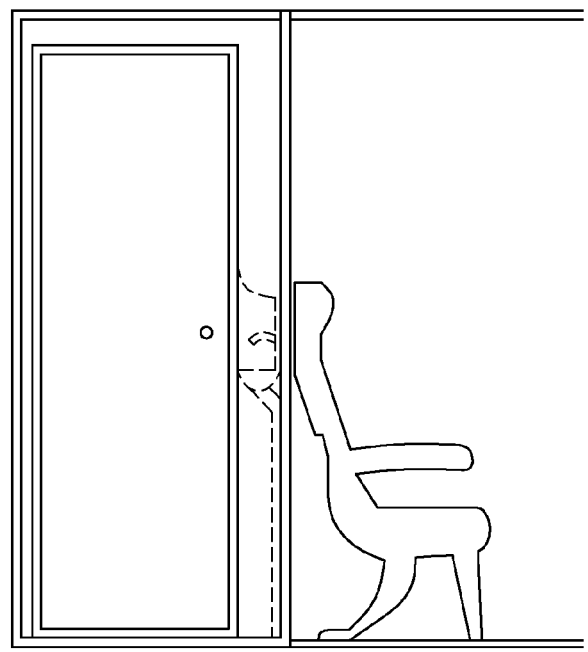
FIG. 1 is a schematic diagram of a prior art lavatory arrangement juxtaposed with an aircraft passenger seat.

FIG. 1 illustrates a prior art version of an aircraft lavatory, juxtaposed with a passenger seat, such as might be found at the rear of a commercial aircraft. The lavatory includes a sink, with a recessed area above the sink to allow the passenger to wash their hands. The area below the sink is available for stowage, but there wall of the lavatory rests against the passenger seat, excluding any means by which further space could be utilized.

Figure 2:
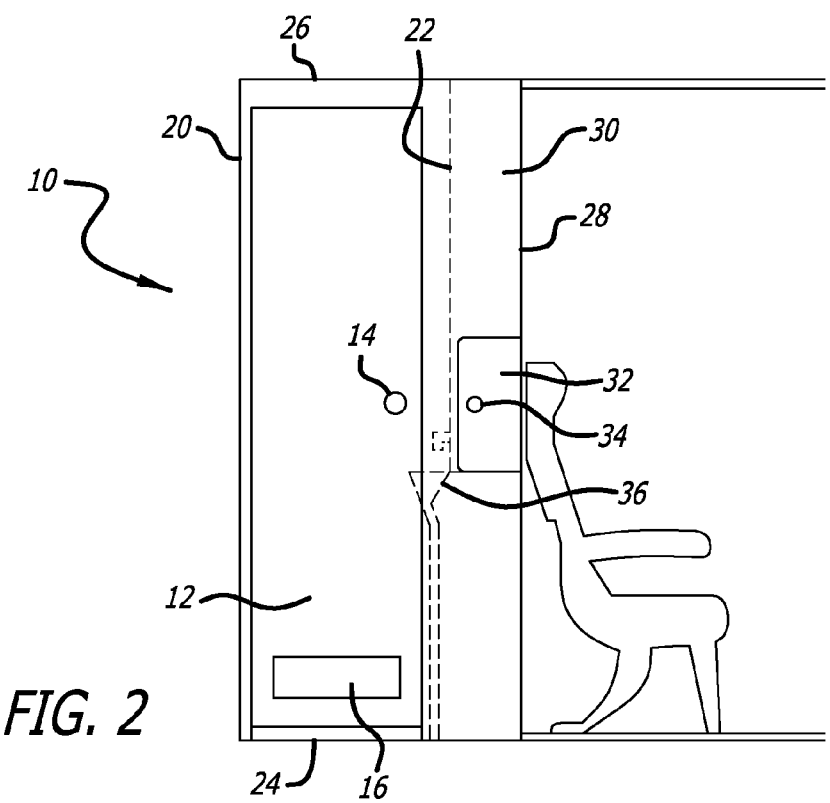
FIG. 2 is a schematic diagram of an installation of a lavatory according to the present invention with new stowage compartment accessible from outside the lavatory.

Turning to FIG. 2, a first embodiment of a lavatory of the present invention is disclosed. The lavatory 10 includes a door 12 with a knob or handle 14 to gain ingress and egress into the lavatory 10, and a vent 16 at the lower portion of the door 12. The lavatory is formed by a first side wall 20 and a second side wall 22. A rear wall (not shown) cooperates with the floor 24 and ceiling 26 to form a standard lavatory compartment. In the present invention, an additional side wall 28 is located adjacent the second side wall 22, forming a volume between the additional side wall 28 and second side wall 22 below the ceiling. This newly created volume can be divided into two smaller volumes, a first volume forming an amenities area 30 for bathroom tissue, soap, paper towels, air sickness bags, and other items found in an aircraft bathroom. The remaining portion of the volume is used to create a stowage compartment 32, accessible from outside the lavatory 10 and preferably having locking means 34. The stowage compartment 32 can be accessed through a door, or it may be a drawer that slides into and out of the volume between the walls 22,28. A low profile sink 36 is shown in shadow illustrating its position within the lavatory. In this case, the sink 36 completely extends inwardly (relative to the compartment) from the plane of the wall 22, as compared with the prior art sink (FIG. 1) in which the sink is disposed behind the plane defined by the wall. By extending the sink inward, the space is created to locate the stowage compartment 32. A commode would be positioned behind the door, but is omitted here for simplicity. The stowage compartment 32 does not need to be positioned directly over the sink, but this provides an efficient location for maximizing the space available between the walls.

Figure 3:
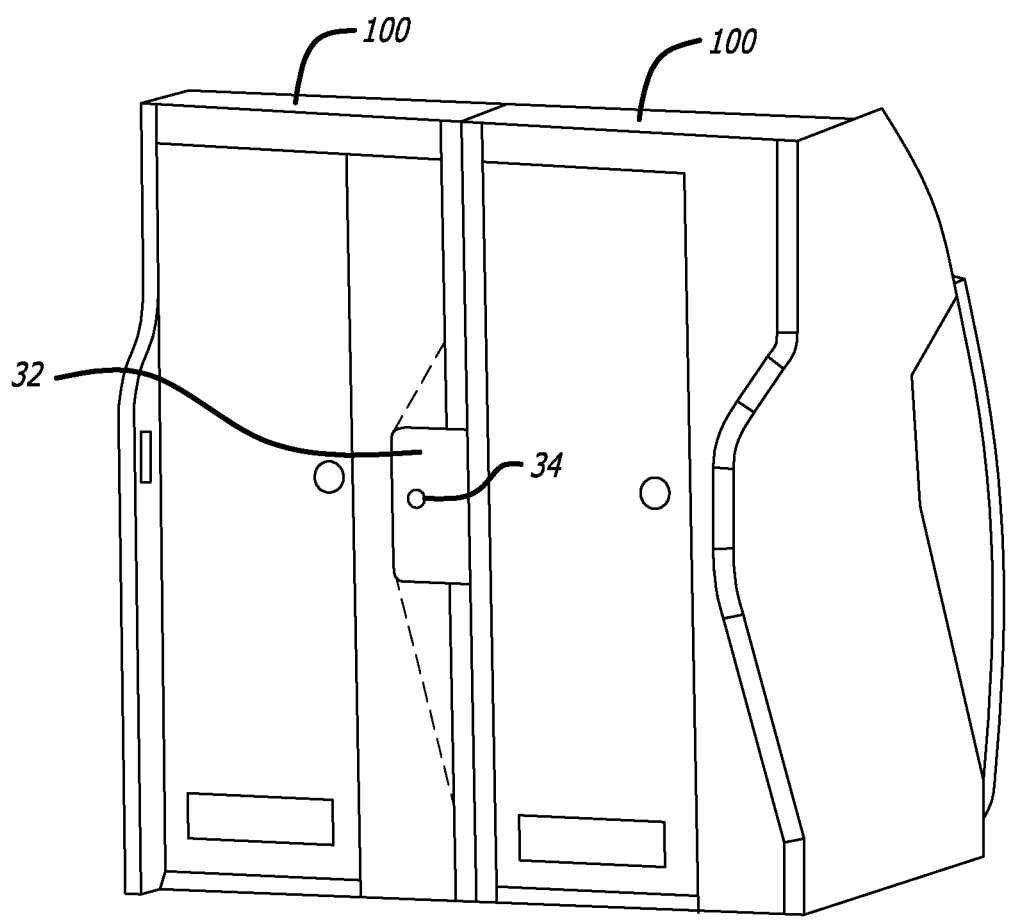
FIG. 3 is a schematic diagram of dual lavatories of a recessed configuration incorporating the present invention.

United States Patent Publication No. 2011/0253835, incorporated by reference herein, illustrates an aircraft lavatory that is shaped to accommodate the seats or other structures that may be adjacent to the lavatory. As shown in FIG. 3, this type of lavatory can also be used in conjunction with the present invention. When two lavatories 100 are placed side-by-side as shown in FIG. 3, the adjacent walls create a space in between that can be used for the stowage compartment 32 of the present invention. Here, one side wall of the lavatory on the right can serve as the outer wall, establishing the volume for the compartment 32 as shown. From the schematic, the contour of the right side of the lavatory is recessed to create a usable space that can accommodate both amenities that are typically located inside the lavatory, plus a separate compartment that can be accessed from the main cabin.

The stowage compartment 32 of the present invention maximizes in an efficient manner the available space that is created by the recessed wall of the lavatory. This stowage compartment 32 can free up space in overhead bins, or provide additional space for galley or emergency equipment.

This lavatory stowage compartment can be used with virtually any aircraft lavatory, and can be adapted for straight walls or recessed walls.

One application of the present invention is the provision of a secure and separate location for aircraft equipment that is normally stowed in overhead bins or stow boxes. The present invention provides easy and convenient access to such equipment along with a designated location that eliminates hunting for certain equipment. The stowage compartment of the present invention also can provide storage space for passenger possessions that do not fit into the overhead bins, or can be overflow storage when the overhead bins are full.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An aircraft lavatory with a stowage compartment, comprising:
   an enclosure having a door, a first side wall, a rear wall, a ceiling, and a second side wall, wherein the second side wall includes a sink, the second side wall defining a plane and wherein the sink is inwardly disposed from said plane with respect to said first side wall;
   an additional side wall parallel to, and adjacent to, and outwardly disposed from said second side wall and said sink with respect to said first side wall, creating a space therebetween; and
   a stowage compartment accessible only from outside said lavatory, the stowage compartment formed between said second side wall and said additional wall.

2. The aircraft lavatory with a stowage compartment of claim 1, wherein said stowage compartment includes locking means.

3. The aircraft lavatory with a stowage compartment of claim 1, wherein said stowage compartment comprises a slide out drawer.

4. The aircraft lavatory with a stowage compartment of claim 1, wherein the additional side wall is part of a second lavatory.

5. The aircraft lavatory with a stowage compartment of claim 4, wherein a second lavatory's wall is substantially not flat in a vertical plane.

\* \* \* \* \*